United States Patent
Boyer, Jr.

(10) Patent No.: US 10,197,219 B1
(45) Date of Patent: Feb. 5, 2019

(54) SECONDARY LIGHT CURTAIN FOR DETECTING CRUSH ZONE INTRUSION IN A SECONDARY PROCESS AND ASSOCIATED METHOD FOR USE

(71) Applicant: Jason Boyer, Zionsville, IN (US)

(72) Inventor: Douglas L Boyer, Jr., Punta Gorda, FL (US)

(73) Assignee: Jason Boyer, Zionsville, IN (US)

( * ) Notice: Subject to any disclaimer, the term of this patent is extended or adjusted under 35 U.S.C. 154(b) by 0 days.

(21) Appl. No.: 15/668,786

(22) Filed: Aug. 4, 2017

(51) Int. Cl.
*F16P 3/14* (2006.01)
*F16P 3/00* (2006.01)
*B21D 5/02* (2006.01)

(52) U.S. Cl.
CPC ............... *F16P 3/144* (2013.01); *F16P 3/005* (2013.01); *B21D 5/02* (2013.01)

(58) Field of Classification Search
CPC . F16P 3/145; F16P 3/144; G01V 8/10; G01V 8/12; G08B 13/183; B21D 55/00; B30B 14/285
See application file for complete search history.

(56) References Cited

U.S. PATENT DOCUMENTS

| | | | |
|---|---|---|---|
| 1,962,742 A | 6/1934 | Jongedyk | |
| 2,082,221 A | 6/1937 | Sheller | |
| 2,241,556 A | 5/1941 | MacMillin et al. | |
| 2,311,441 A | 2/1943 | Lloyd | |
| 2,798,583 A | 7/1957 | Jeszka et al. | |
| 3,276,557 A | 10/1966 | Brown | |
| 4,166,369 A | 9/1979 | Nakajima | |
| 4,357,820 A | 11/1982 | Blanchard | |
| 4,660,703 A | 4/1987 | Filcich | |
| 4,699,260 A | 10/1987 | Nieberding, Jr. | |
| 4,772,801 A | 9/1988 | Cybelec | |
| 4,907,432 A | 3/1990 | Cybelec | |
| 5,579,884 A | 12/1996 | Appleyard | |
| 6,131,429 A | 10/2000 | Ward | |
| 6,218,940 B1 | 4/2001 | Rejc et al. | |
| 6,243,006 B1 | 6/2001 | Rejc et al. | |
| 6,316,763 B1 | 11/2001 | Appleyard | |
| 6,677,574 B2 | 1/2004 | Fiessler | |
| 6,752,253 B2 | 6/2004 | Fiessler | |
| 6,919,554 B2 | 7/2005 | Braune et al. | |

(Continued)

FOREIGN PATENT DOCUMENTS

| AU | 781394 | 5/2005 |
|---|---|---|
| CA | 2380291 | 2/2010 |

(Continued)

*Primary Examiner* — Pradeep C Battula
(74) *Attorney, Agent, or Firm* — Pitts & Lake, P.C.

(57) ABSTRACT

A secondary light curtain for preventing injury to an operator of a press brake during formation of a second flange on a workpiece and a method for using the same. The secondary light curtain detects intrusion by the operator into a crush zone, i.e. the area, between the ram and the leading edge of a prior formed flange. In order to provide for ready adjustment of the height of the secondary light curtain, a mounting bracket having a longitudinal mounting slot, and a cooperating secondary angle bracket are provided. The mounting bracket of the present invention allows the secondary light curtain light assemblies to be mounted directly on the front or side of the ram.

6 Claims, 11 Drawing Sheets

(56) References Cited

U.S. PATENT DOCUMENTS

| | | | |
|---|---|---|---|
| 6,919,555 B2 | 7/2005 | Fiessler | |
| 7,080,534 B2 | 7/2006 | Schneiderheinze | |
| 7,439,512 B2 | 10/2008 | Garland | |
| 7,448,242 B2 | 11/2008 | Dieterle et al. | |
| 7,454,935 B2 | 11/2008 | Braune et al. | |
| 8,519,659 B2 * | 8/2013 | Someya | B30B 15/285 318/560 |
| 2004/0207847 A1 * | 10/2004 | Hardy | G01V 8/10 356/399 |
| 2013/0269962 A1 | 10/2013 | Fiessler | |
| 2013/0333190 A1 * | 12/2013 | Mizumura | B21D 35/005 29/428 |
| 2014/0117216 A1 * | 5/2014 | Torosian | F16P 3/144 250/221 |
| 2015/0314364 A1 | 11/2015 | Fiessler | |

FOREIGN PATENT DOCUMENTS

| | | |
|---|---|---|
| CA | 2411215 | 5/2010 |
| DE | 4324916 | 1/1995 |
| DE | 19928831 | 12/2000 |
| DE | 20104328 | 6/2001 |
| DE | 20103828 | 7/2001 |
| DE | 10027156 | 12/2001 |
| DE | 19717299 | 3/2002 |
| DE | 10120940 | 10/2002 |
| DE | 10123562 | 11/2002 |
| DE | 10232795 | 7/2003 |
| DE | 10246609 | 2/2004 |
| DE | 10342431 | 4/2005 |
| DE | 202005002797 | 9/2005 |
| DE | 102005035286 | 2/2007 |
| DE | 102005035889 | 2/2007 |
| DE | 202006007555 | 10/2007 |
| DE | 102007020950 | 11/2008 |
| DE | 10315667 | 1/2012 |
| DE | 102011114279 | 3/2013 |
| DE | 102012004031 | 9/2013 |
| EP | 224437 | 7/1989 |
| EP | 789182 | 8/1997 |
| EP | 995942 | 4/2000 |
| EP | 902158 | 2/2003 |
| EP | 902157 | 3/2003 |
| EP | 977641 | 6/2004 |
| EP | 1200767 | 10/2004 |
| EP | 1258667 | 11/2005 |
| EP | 1319886 | 12/2005 |
| EP | 1387121 | 5/2006 |
| EP | 1515078 | 4/2007 |
| EP | 1632707 | 5/2007 |
| EP | 1854605 | 1/2008 |
| EP | 2147729 | 3/2011 |
| EP | 1748246 | 1/2012 |
| EP | 2573445 | 3/2013 |
| EP | 2634470 | 9/2013 |
| EP | 1589279 | 10/2013 |
| EP | 2633925 | 9/2014 |
| EP | 1748245 | 10/2014 |
| EP | 2644962 | 10/2015 |
| EP | 2940369 | 11/2015 |
| WO | WO1998047645 | 10/1998 |
| WO | WO2001092777 | 12/2001 |
| WO | WO2013166538 | 11/2013 |

* cited by examiner

SECONDARY LIGHT CURTAIN FOR DETECTING CRUSH ZONE INTRUSION IN A SECONDARY PROCESS AND ASSOCIATED METHOD FOR USE

CROSS-REFERENCE TO RELATED APPLICATIONS

This application claims the benefit of U.S. Provisional Patent Application No. 62/371,457, filed on Aug. 5, 2016, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to a protective light curtain for metal forming machines such as press brakes; and more particularly relates to a new and improved secondary light curtain, and an associated method for using the same, for protecting an operator, during a secondary operation, from the risk of having a limb, such as a hand or one or more fingers, crushed between a bent portion of a workpiece and an upper portion of a press brake during a secondary bending process.

2. Description of the Related Art

In the art of sheet metal fabrication, i.e. non-cutting processing of sheet metal workpieces into formed metal pieces, a known method for such non-cutting processing is bending. In this case, a workpiece, which is often flat sheet metal is bent under pressure, commonly by use of a press brake. In a press brake, the workpiece is essentially formed, i.e. bent, by being pressed with a punch against a die. The desired shaping can be achieved by appropriate design of the punch and the die. The punch is often a tool that is arranged on a first, movable machine part, referred to herein as a ram, whereas the die sits on a second, fixed machine part. It is known in this art that a press brake poses a considerable risk to the operating personnel, in particular the risk of crushing or even of the risk severing of body parts. Accordingly, it is known to provide press brakes and the like with a safety apparatus in order to protect personnel from the pinch point which is defined herein as the area around and between the punch and the die. It is known in the art that this protection frequently takes the form of a light curtain, which is a protection device with a plurality of individual light beams arranged in such a way that it moves downwards with the punch. In the event that all or a portion of the light curtain is interrupted as by the intrusion of the operator's hand into the pinch point near the punch and the die, the movement of the punch is halted. In another form of protection, a light barrier is provided in which two or three light beams run parallel to the leading edge of the punch and in advance of the die. If one of the light beams is interrupted, the movement of the punch stops. If there are only two light beams, they run so as to be offset symmetrically forwards (towards the operator side) and rearward (towards the side remote from the operator) of the punch. It is also known to use a third light beam below the leading edge of the punch. This third light beam frequently serves primarily as control beam in order to prevent the mute point from being set too deep.

The mute point is the point in the sequence of movement of the punch during which the light beams of the safety apparatus are deactivated for a short time period. This is because the actual processing operation could not be completed without such a short deactivation, since the punch is otherwise always stopped when the workpiece to be processed interrupts the light beams. Exemplary art includes U.S. Pat. No. 7,080,534, and the various references cited therein, U.S. Pat. No. 5,579,884, and U.S. Pat. No. 4,669,260.

Thus, it is known in the art to provide a light curtain for press brakes and the like in which light barriers are used in order to detect an intrusion of an operator into the hazardous area known as the pinch point, i.e. in the area around and between the punch and the die and to stop the punch in the event of such an intrusion. However, it is also known in the metal fabrication arts that often multiple bends are made on a given workpiece. When a secondary process results in creating a second flange at an angle to the body of the workpiece, and generally extending in approximately the same direction as the first flange, there is a further risk of an operator's hands being crushed, not at the pinch point between the punch and the die, but rather between the ram and the leading edge of the previously formed flange of the workpiece.

What is missing from the art is a secondary light curtain adapted to detect intrusion by all or a portion of an operator's hand, or one or more fingers, into the crush zone i.e. the area, between the ram and the leading edge of a prior formed flange. This intrusion is known to occur when/if the operator is resting his or her hand on the leading edge of the prior formed flange while the punch is forming the second flange and is pressing the workpiece into the die. What is further missing is an adjustable mounting bracket adapted to allow ready and rapid adjustment of the height of this secondary light curtain. What is further missing in the known art is a method of using a secondary light curtain for the purpose of detecting an intrusion by a foreign object, such as a portion of the operator's body, into the crush zone.

BRIEF SUMMARY OF THE INVENTION

According to an exemplary embodiment of the present invention, a secondary light curtain, and a method for using the same to prevent crushing injuries is provided. The secondary light curtain detects intrusion by the operator into a crush zone and interrupts the operation of the press brake in order to prevent injuries to the operator. It will be appreciated that the secondary light curtain assembly of the present invention must be mounted so as to detect incursions into the crush zone; and that the location of the crush zone is dependent on a number of variables such as the overall length of the workpiece, the distance between the two flanges on the workpiece, and the types of punches and dies being utilized to form a given workpiece. Accordingly, the crush zone is not in a fixed position relative to the punch. In order to provide for ready adjustment of the height of the secondary light curtain, a mounting bracket having a longitudinal mounting slot, and a cooperating secondary angle bracket are provided. The mounting bracket of the present invention allows the secondary light curtain light assemblies to be mounted directly on the front or the side of the ram. When mounted on the side of the ram, a cooperating angle bracket is used in combination with the mounting bracket.

In accordance with the present invention, the method of utilizing a secondary light curtain to detect intrusions into the crush zone and thereby prevent injuries to an operator includes at least the following steps. The press brake is provided with a secondary light curtain assembly including a light curtain emitting array and a light curtain detecting array that are in operative communication with the ram. This light curtain is, as will be discussed in greater detail below, selectively positioned so as to emit a light curtain at a selected position in relation to the ram in order to detect intrusion by a foreign object, such as the operator's fingers into the crush zone. If an operator's fingers are in the crush zone, this intrusion is detected by the light curtain array, and upon detection of such an intrusion, the downward movement of the ram is ceased, such that operation of the press brake is halted upon detection of the intrusion by the foreign object into the crush zone. Upon cessation of the operation of the press brake, the operator removes the foreign object, likely the operator's fingers, from the crush zone, and resets the press brake so as to resume the process and complete the process of forming a subsequent flange on the workpiece.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
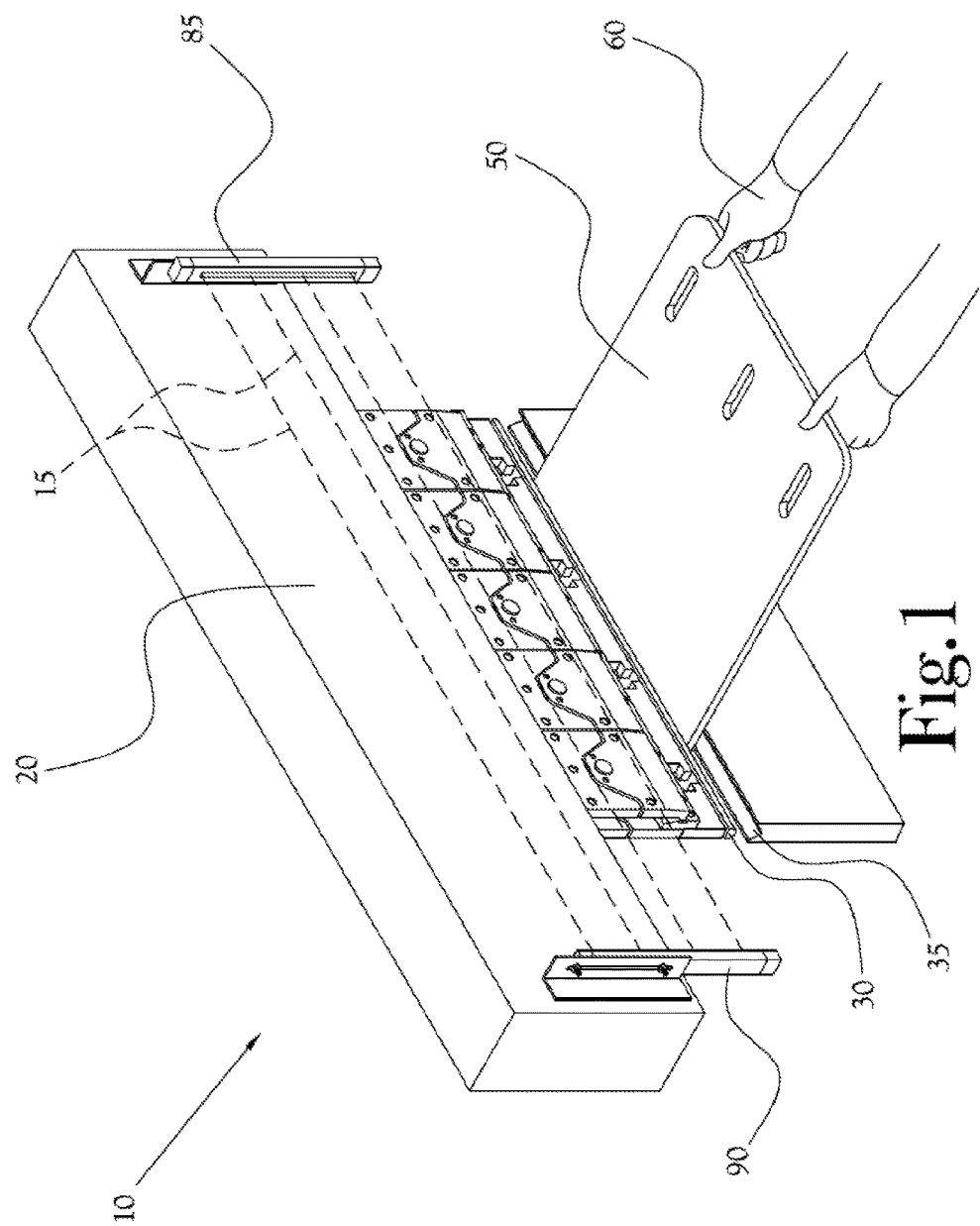
FIG. 1 is a perspective view of an operator positioning a workpiece for a primary operation in a press brake having a secondary light curtain for detecting intrusion into a crush zone during a secondary process.

FIGS. 1-5 illustrate both the basic steps involved in performing multiple processes to shape sheet metal on a press brake, and also illustrate the danger that the present invention is intended to reduce if not eliminate. In this regard, it is known that sheet metal is often bent into predetermined shapes on a press brake 10 which, as will be clearly understood by those skilled in the art, includes a ram 20 on which is carried a punch 30. As will be further understood, the ram 20 drives the punch 30 towards a die 35. It is the motion of driving the punch 30 into the die 35 that forms a flange on a workpiece, such as workpiece 50 in the Figures. In this regard, it is not uncommon that a plurality of flanges will be formed on a given workpiece. The known prior art safety devices, such as primary safety device 40, prevent intrusion by the operator into the area known as the pinch point, i.e. the area in between, and in very close proximity to, the punch 30 and the die 35.

Figure 2:
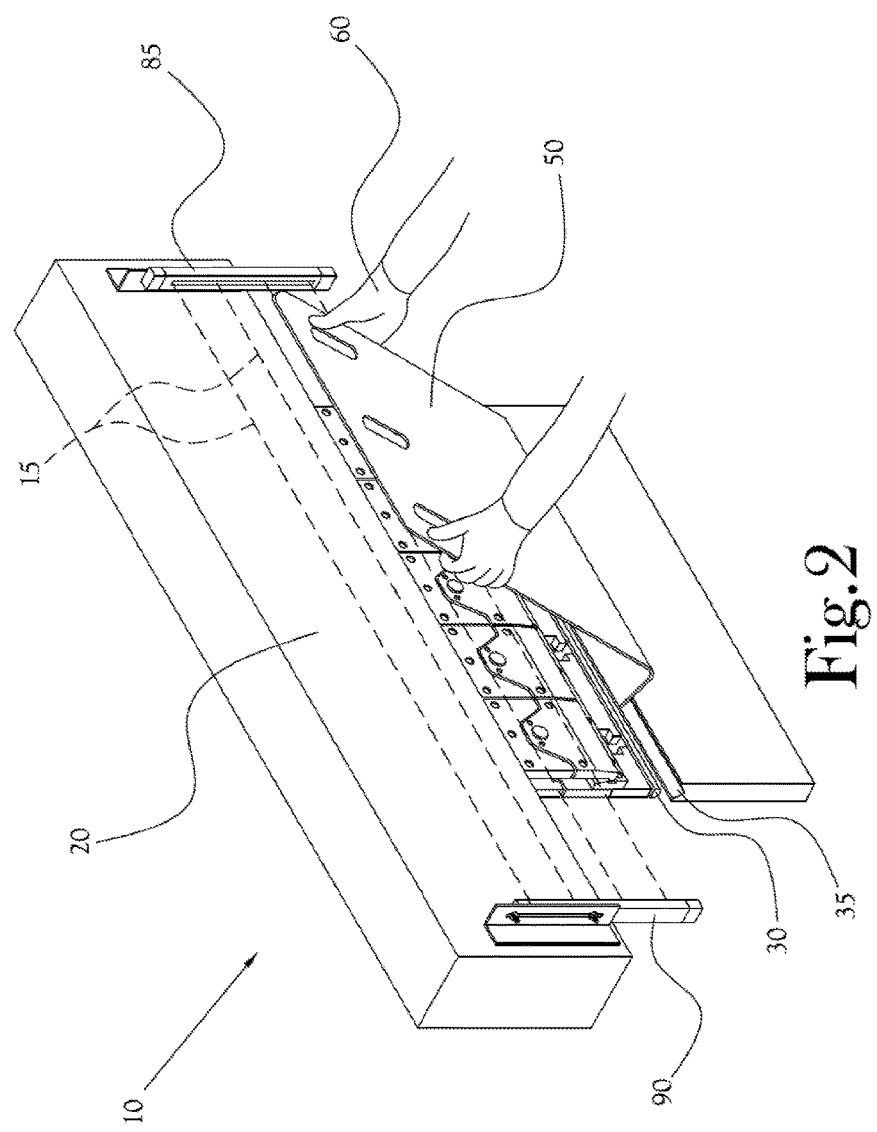
FIG. 2 is a perspective view of the operation being performed in FIG. 1 after the primary process has been performed on the workpiece.
Figure 3:
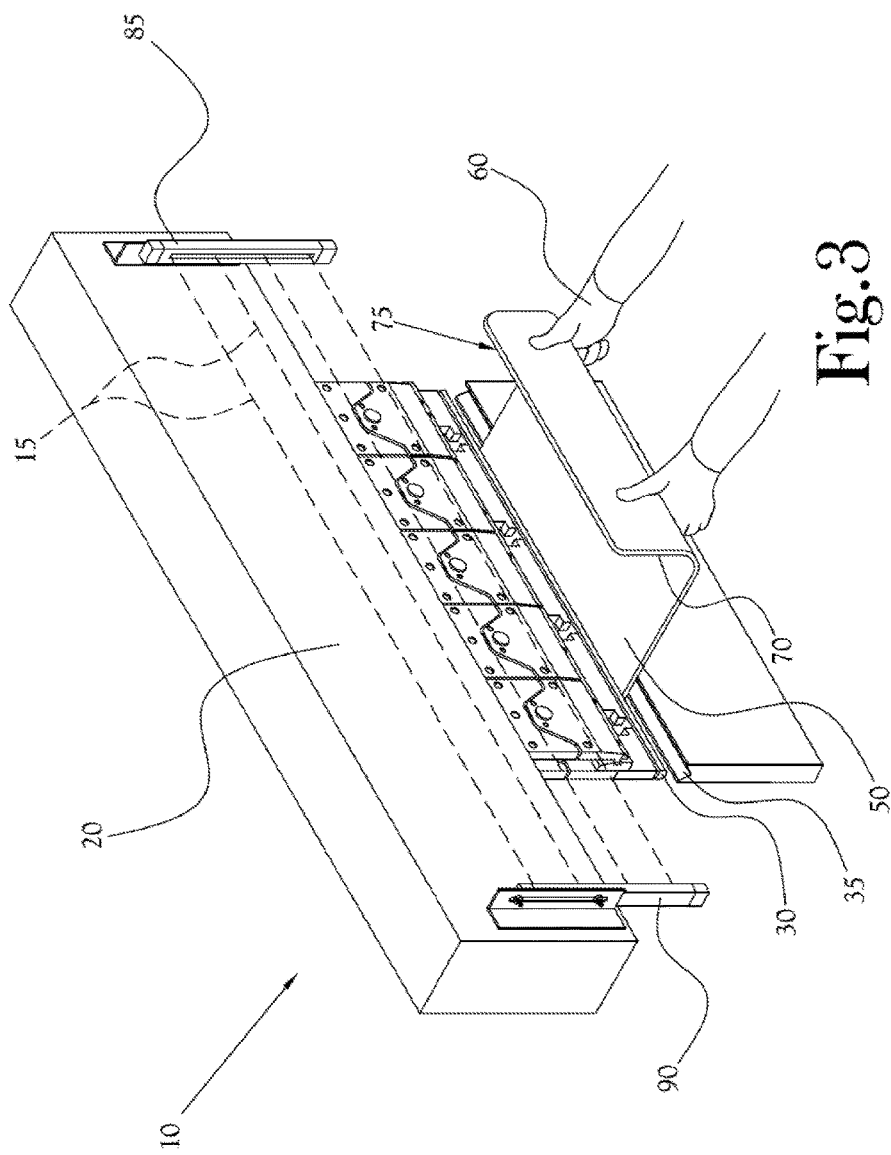
FIG. 3 is a perspective view of an operator positioning the workpiece shown in FIG. 1 for a secondary operation in a press brake having a secondary light curtain for detecting intrusion into a crush zone during the secondary process.
Figure 4:
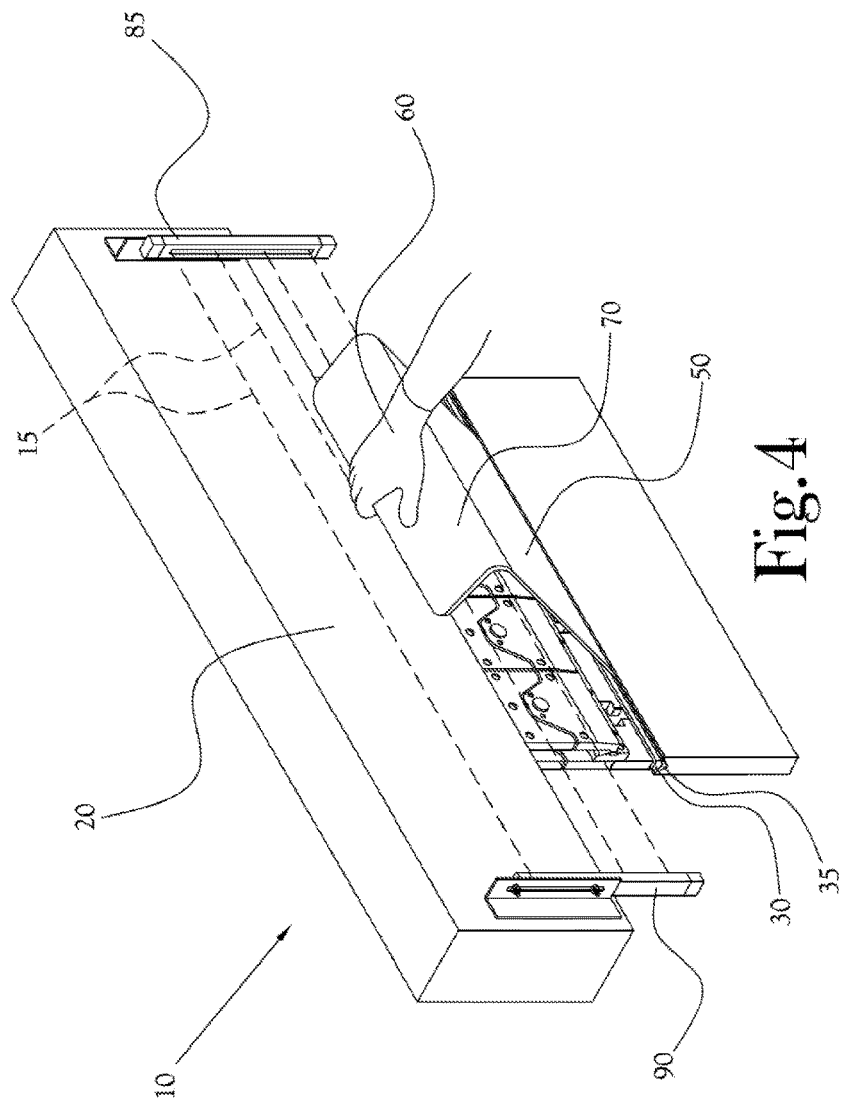
FIG. 4 is a perspective view of the operator's hand at risk of being caught between the first flange of the workpiece and the body of the ram and interrupting the secondary light curtain.
Figure 5:
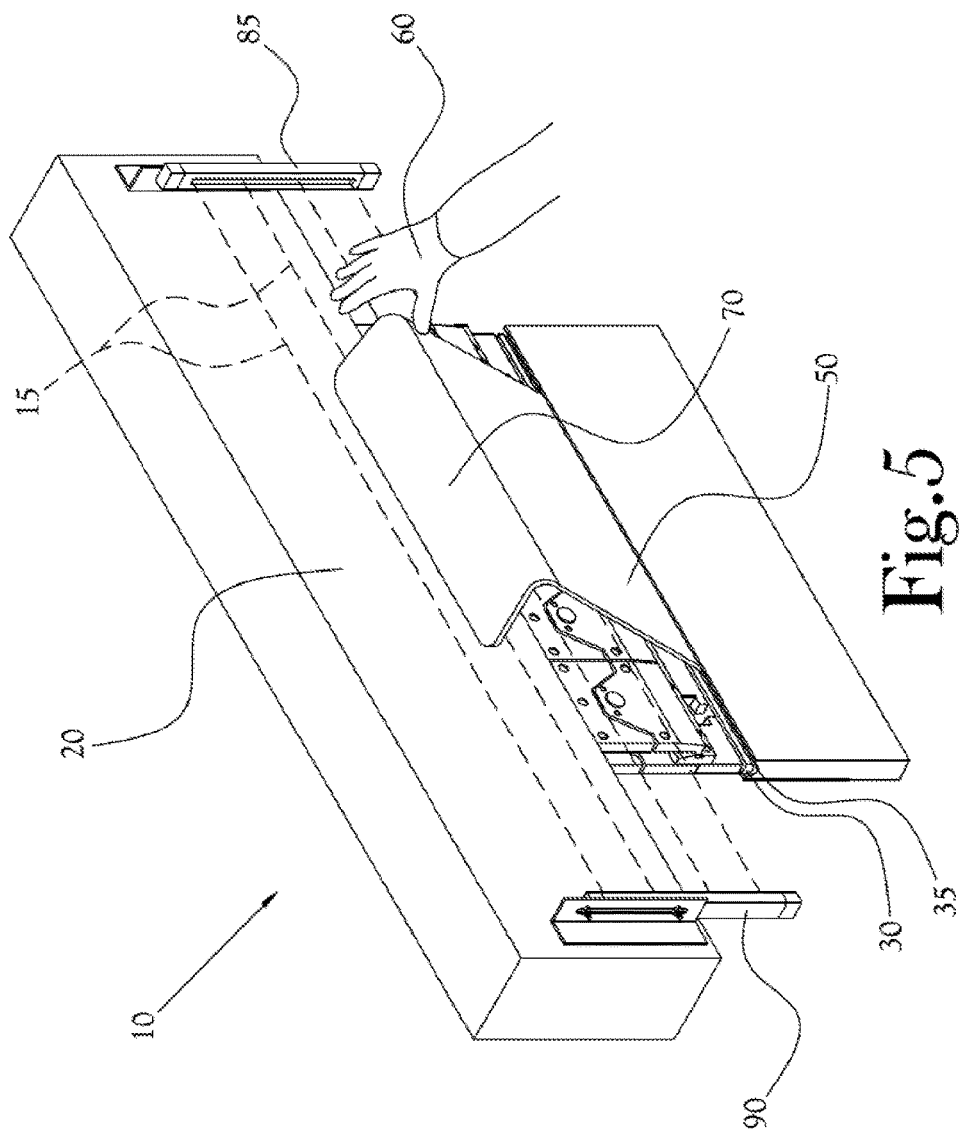
FIG. 5 is a perspective view of the press brake completing the secondary operation on the workpiece subsequent to the operator's hand being removed from the crush zone between the first flange and the ram.
Figure 6:
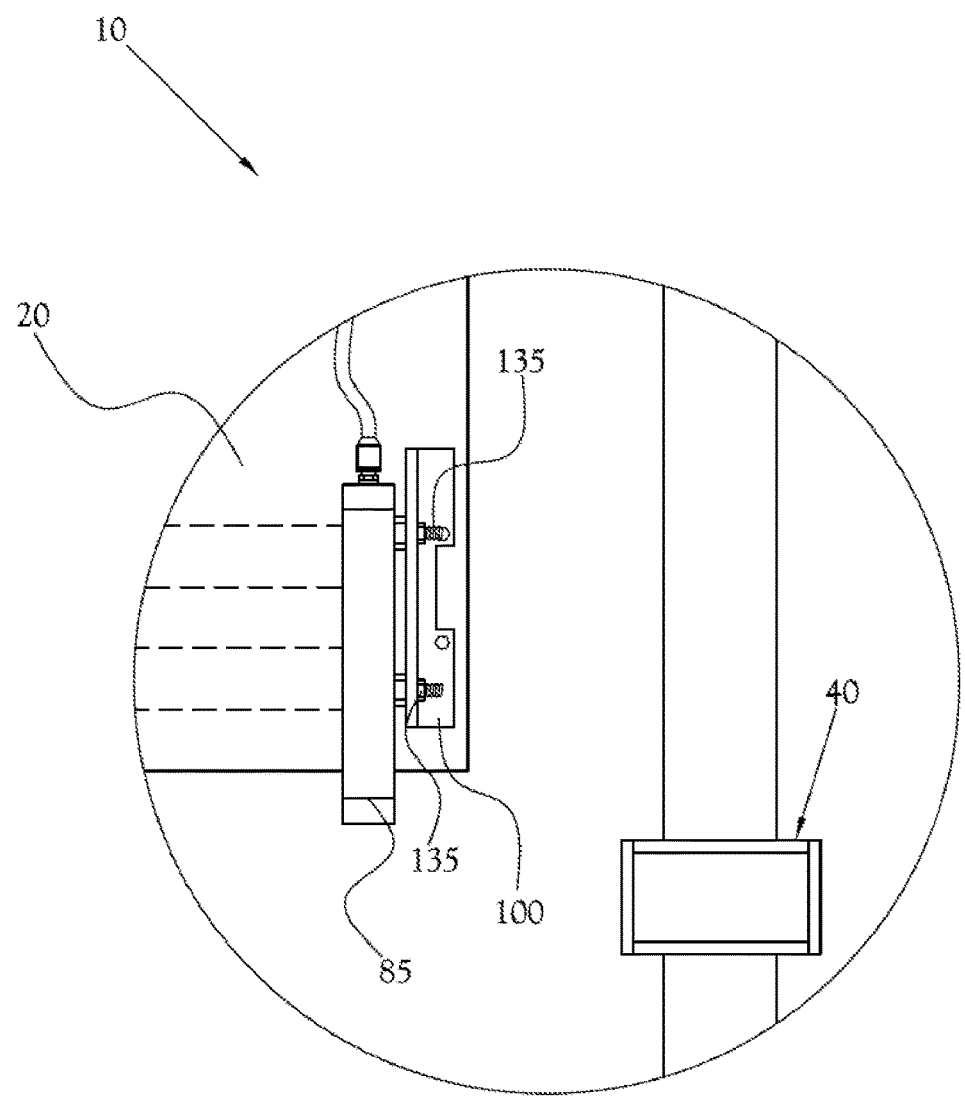
FIG. 6 is a front elevation view of an exemplary mounting position of the light emitter and light detector assembly of the secondary light curtain of the present invention.
Figure 7:
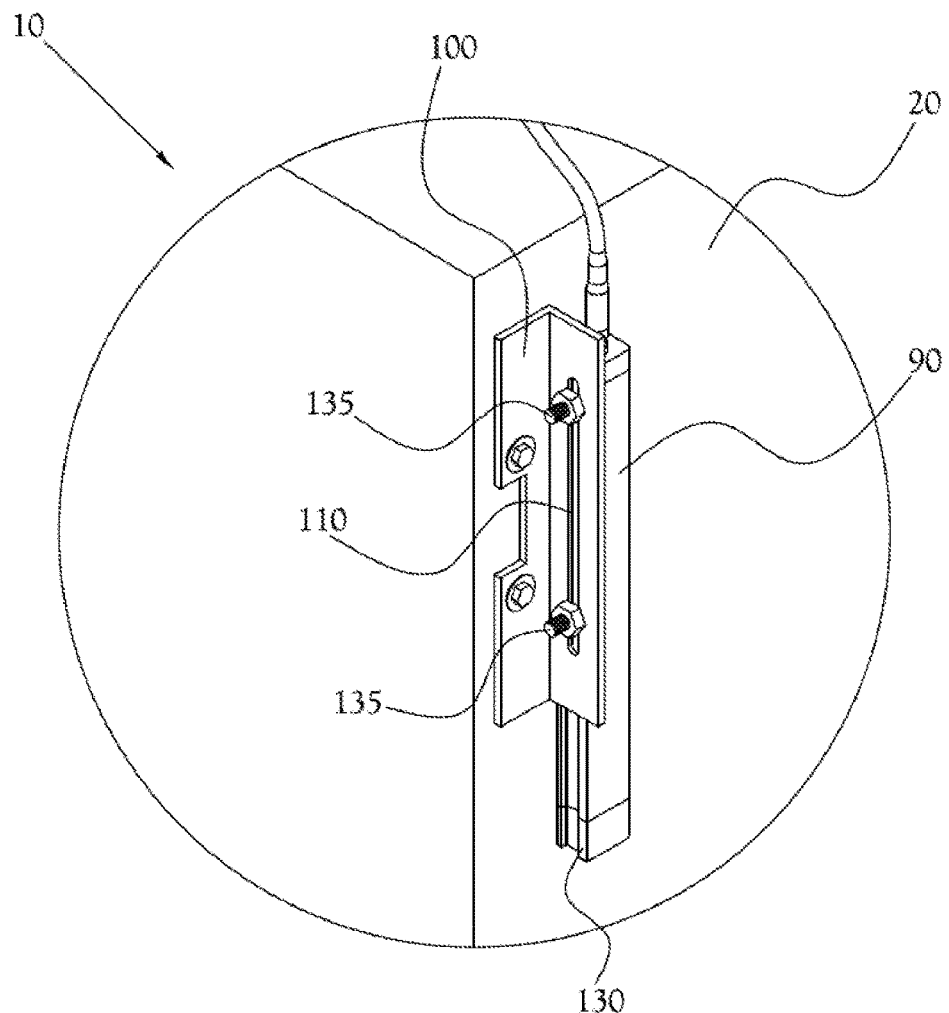
FIG. 7 is a perspective view of the light receiver/detector assembly of the secondary light curtain and associated multi-purpose mounting bracket of the present invention mounted directly to the ram of a press brake.

Referring to FIG. 1, an operator has placed workpiece 50 on die 35 in preparation for the primary process of forming the first flange on workpiece 50. In FIG. 2, the primary process has been executed and the first flange 70 has been formed on workpiece 50; and the operator is removing flange 50 from between the punch 30 and die 35 in preparation for performing the secondary process of forming a second flange on workpiece 50. As seen in FIG. 3, the workpiece 50 has been repositioned between the punch 30 and die 35 in order to perform a secondary process that will form a second flange on workpiece 50. This second flange extends generally in the same direction away from workpiece 50 as does the first flange 70. It will be appreciated that this creates a risk of crushing an operator's hand 60 against the ram 20, or the tooling of the punch 30, depending upon the length of the workpiece 50, if the operator is resting his or her hand 60 on the leading edge 75 of the first flange 70. This area, between the leading edge 75 of flange 70 and the ram 20 is defined herein as the crush zone; and it is in this area, the crush zone for which the present invention is designed to detect intrusion by a foreign object, such as a portion of the operator's body. This risk of injury is illustrated in FIG. 4, in which the operator's hand 60 is grasping the leading edge 75 of flange 70 while the punch 35 is forming the second flange and is pressing workpiece 50 into the die 35. At this point in the process, the secondary light curtain 15 for detecting an intrusion into the crush zone during this secondary process has been interrupted and, thus, has detected the presence of the operator's hand 60 in the crush zone and has halted the downward motion of the punch 30 in order to allow the operator to remove his hand 60 from the crush zone; and, in FIG. 5, the operator has removed his hand 60 from the crush zone, reset the operation of the machine and reactivated the punch by any of several known methods, such as a footswitch (not illustrated), and the punch 30 has completed its downward motion forming the second flange on the workpiece 50.

It will be appreciated that, as described above, the secondary light curtain assembly of the present invention must be mounted so as to detect incursions into the crush zone. However, the crush zone is not in a fixed position relative to the punch, but is, rather, dependent upon the length of the workpiece 50 being formed. In order to accommodate this fact, the secondary light curtain emitter array 85 and the secondary light curtain receiver, or detector, array 90 must be mounted in a manner such that the effective height of the secondary light curtain is adjustable. As will be described in greater detail below, a controller is used conventionally, in a manner well known and understood by those skilled in the art, to control the downward motion of punch 30 in response to interruption of the secondary light curtain. Further, it will be recognized that conventional light emitter arrays, utilizing visible light, infrared light, or laser light, and light detectors, can be used as components of the secondary light curtain assembly.

Referring to FIGS. 6-11, an exemplary embodiment for accomplishing this desired adjustability is illustrated. In this regard, a mounting bracket 100 is provided which is adapted, as will be explained below, for mounting on or proximate the ram in a variety of places. Mounting bracket 100 is an elongated L-shaped bracket having first and second orthogonal plates 105 and 115, respectively. Mounting bracket 100 includes at least a pair of mounting hole members disposed on second orthogonal plate 115 for receiving a pair of bolts for securing the mounting bracket 100 to the ram 20. Further, an elongated, longitudinal slot member 110 is disposed on first orthogonal plate 105. In this regard, as will be understood by those skilled in the art, the light emitting and light detecting arrays, 85 and 90 include a longitudinal groove 130 adapted for receiving a mounting bolt 135. Mounting bolt 135 is received through the longitudinal slot 110; the longitudinal groove 130 and the longitudinal slot 110 allow for infinite adjustment along the length of the longitudinal slot 110. Further providing for adjustment of the height of the secondary light curtain, mounting bracket 100 is adapted to be bolted, screwed, or secured by other means, directly to the face of the ram 20.

Figure 8:
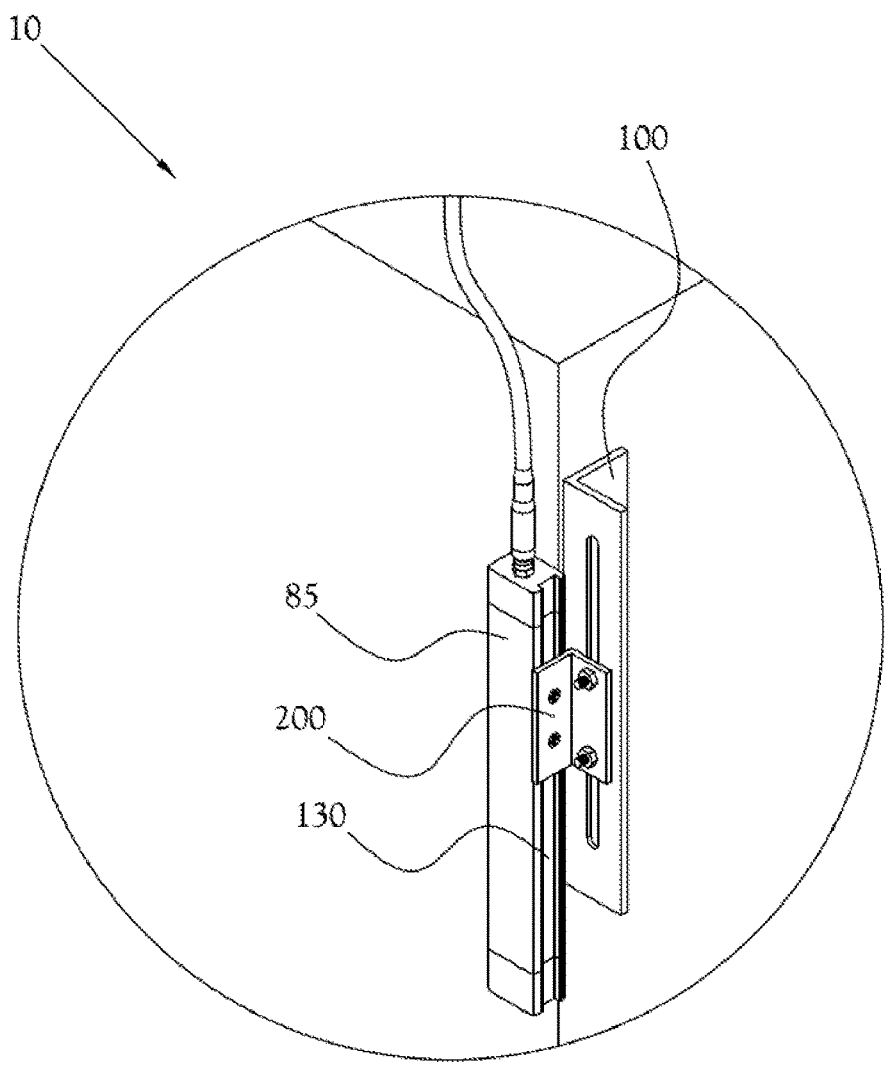
FIG. 8 is a close-up perspective view of the secondary light curtain emitter assembly of the present invention and associated multi-purpose mounting bracket illustrating an alternate mounting configuration.
Figure 11:
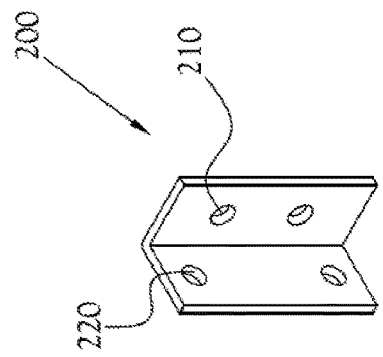
FIG. 11 is a close-up perspective view of the cooperating angle bracket illustrating an exemplary embodiment of the requisite bolt holes.
Figure 10:
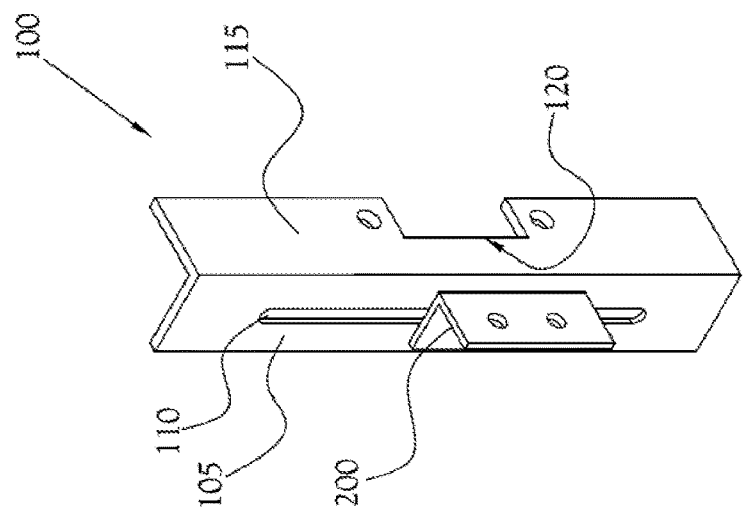
FIG. 10 is a perspective view of the multi-purpose mounting bracket illustrated in FIG. 9 along with the cooperating angle bracket.
Figure 9:
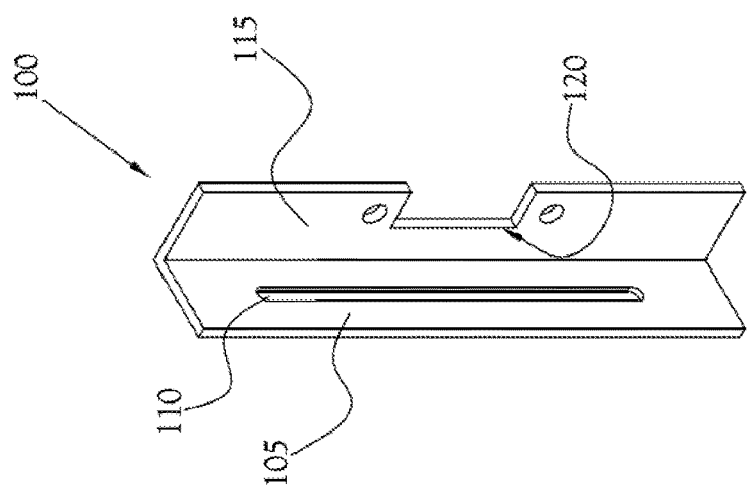
FIG. 9 is a perspective view of the multi-purpose mounting bracket of the present invention.

Referring to FIG. 8, mounting bracket 100, in an exemplary embodiment, can be provided with a cut-out gap member 120 on the second orthogonal plate 115 of mounting bracket 100. It will be recognized that when mounting bracket 100 is mounted directly to the face of the ram 20, the first orthogonal plate 105 is perpendicular to the ram and is in the desired position to receive one of the secondary light curtain assemblies 85 and 90. However, when mounting bracket 100 is secured to a side of the ram 20, the first orthogonal plate 105 is parallel to ram 20. In order to provide a mounting surface for the secondary light curtain assemblies 85 and 90, a secondary angle bracket 200 is provided. The secondary bracket is mounted to the internal groove 130 of the secondary light curtain assemblies 85 and 90 and is also secured to the elongated slot member 110. This still allows the height of the secondary light curtain assemblies 85 and 90 to be adjustable. Further, comparing FIGS. 7 and 8 it can be seen that mounting bracket 100 allows the mounting position of the secondary light curtain assemblies 85 and 90 for secondary light curtain to be moved inward or outward depending upon whether the secondary light curtain assemblies 85 and 90 for secondary light curtain are mounted directly on the front or the side of the press brake.

Figure 12A:
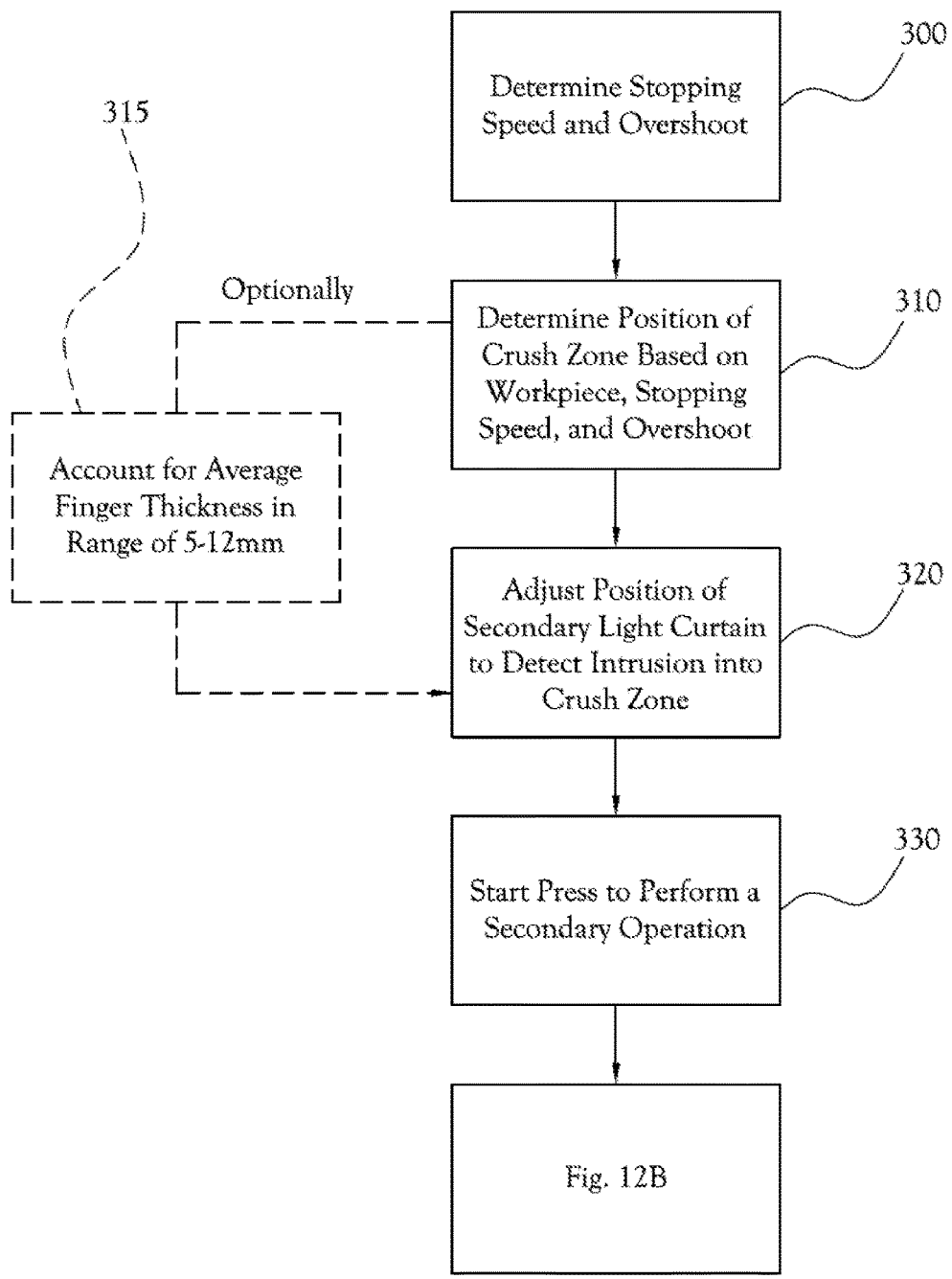
FIGS. 12A and 12B are a flow chart schematically illustrating the various steps of the method of the present invention.
Figure 12B:
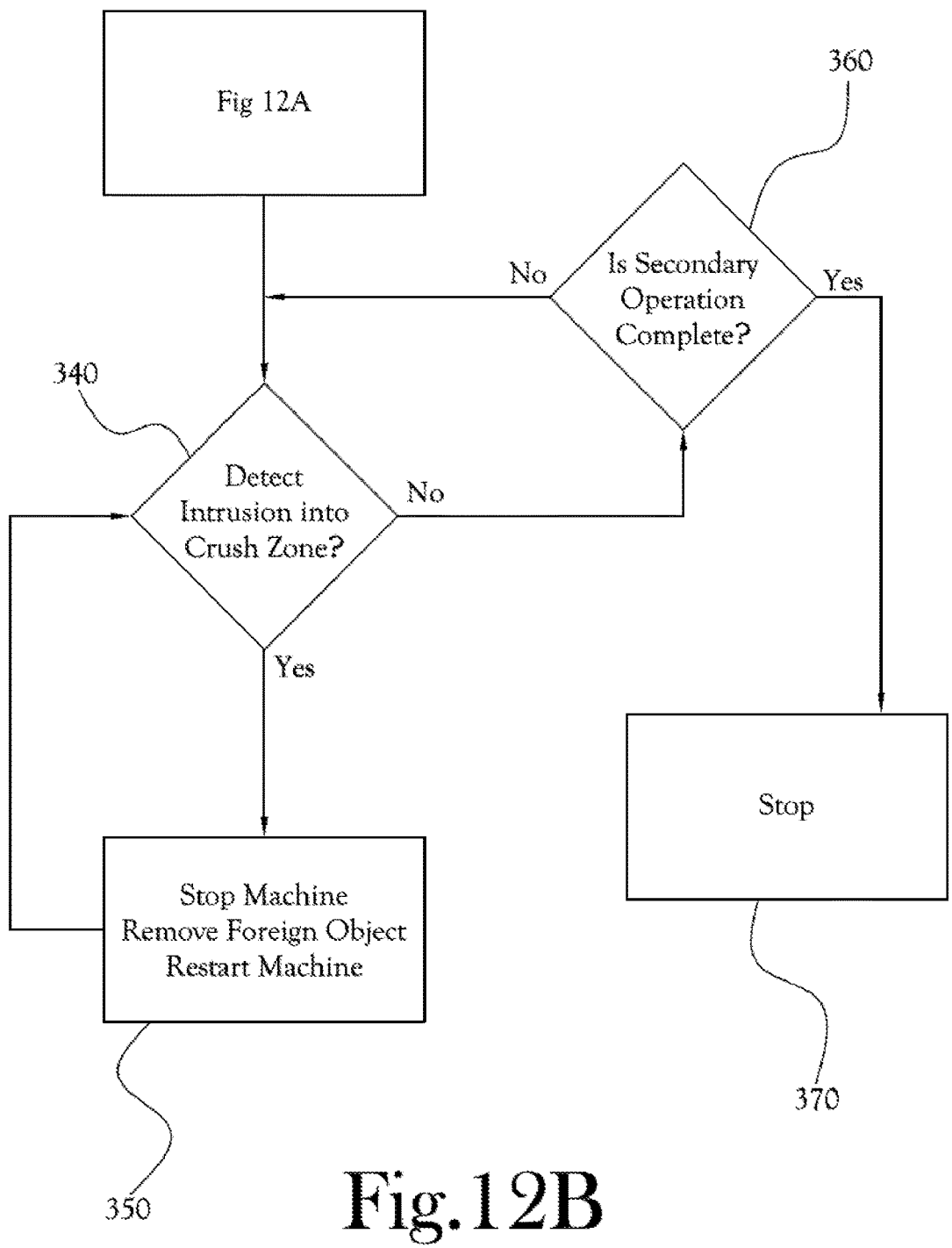

Referring to the flow chart in FIGS. 12A and 12B, an exemplary method for using the secondary light curtain of the present invention is described. As described above, the press brake is provided with a secondary light curtain assembly including a light curtain emitting array and a light curtain detecting array, in which the secondary light curtain assembly is in operative communication with the ram. As set forth above, one exemplary object of the present invention is to cease downward movement of the press brake ram upon detection of an intrusion by a foreign object into the crush zone. In an exemplary embodiment, the secondary light curtain is selectively positioned such that intrusion of the operator's fingers into the crush zone, as illustrated in FIGS. 4A and 4B, will be detected and downward movement of the ram stopped before the operator's fingers are crushed, and further such that this secondary operation can be completed without the flange on the workpiece intruding into the crush zone. In this regard, the secondary light curtain assembly is selectively positioned so as to emit a light curtain at a selected position in relation to the ram in order to detect intrusion by a foreign object, such as, for example, the operator's fingers resting on the leading edge of the primary flange, into the crush zone, i.e. between the primary flange on the workpiece and the ram.

It will be appreciated by those skilled in the art that the average depth of an adult's finger, gloved or ungloved, is in a range of between approximately 5-12 mm. Thus, there are critical tolerances involved in positioning the light curtain relation to the ram such that the operator's fingers will interrupt the light curtain and trigger stopping the ram without the flange itself interrupting the light curtain prior to completion of the secondary operation. Accordingly, the stopping speed of the press brake, i.e. the time differential between detection of an intrusion into the crush zone and the time that the ram actually ceases downward movement, must be determined 300. As will be recognized by those skilled in the art, this stopping speed is determined by a number of factors, including the weight of the ram itself, the speed and efficiency of the electrical relays utilized in the command system energizing the ram, and the speed and efficiency of the valves in the hydraulic system driving the ram, as well as overshoot, i.e. the inherent lag in the system between the time that the machine is commanded to stop and a the machine coming to a full stop. As is known in the art, even the age and actual viscosity of the hydraulic oil utilized in the hydraulic system impact the machine's stopping speed and overshoot. As will be appreciated by those skilled in the art, it is known to calibrate the stopping speed, sometimes referred to as over-shoot, of the machine when an operation is commenced and at regular intervals during operation, for example, every four hours.

In addition to stopping speed, the position of the light curtain must be determined 310. The position of the light curtain is determined by a combination of factors including the length of the workpiece, the length of the primary flange, the configuration of the v-die opening, and the operational speed of the ram. Each of these variables impact, or effect, the speed or pace at which the workpiece rises during the secondary operation. Based on this data, the position of the secondary light curtain is adjusted 320 such that the presence of the operator's fingers in the crush zone will be detected but that the end of the flange itself will not intrude into the crush zone and thereby unnecessarily interrupt operation of the machine. As an optional step, the depth of the crush zone can account 315 for the thickness of an average adult finger, gloved or ungloved, which is, as stated above, in a range of approximately 5-12 mm.

Once these steps have been completed, and the machine is setup to form the desired flanges, the primary flange can be formed. As will be understood by those skilled in the art, the primary or first flange is typically formed between steps 320 and 330. The operator then depresses a foot switch 330 to perform the secondary operation. It will be appreciated that a different trigger device may be utilized for activating the ram, depending upon the make and model of the press brake and control system being used to start the press. During the operation of the machine to perform this secondary operation if an intrusion into the crush zone is detected 340 by the secondary light curtain, the machine is stopped, the foreign object is removed from the crush zone, and the machine is restarted 350. In this regard, upon detection of an intrusion into the crush zone, downward movement of the ram is stopped such that operation of the press brake is halted upon detection of an intrusion, i.e. the presence of a foreign object in the crush zone so as to prevent the foreign object, i.e. the operator's fingers, from being crushed in the crush zone.

Upon cessation of the downward movement of the ram, the operator removes his or her fingers, or other foreign object, from the crush zone and resets the machine to continue the secondary operation. In an exemplary embodiment, the machine is reset by the operator releasing the trigger mechanism, often a foot pedal, and re-activating the trigger mechanism, by, for example, depressing the foot pedal. In an exemplary embodiment, the light curtain is operational to detect such an intrusion until the operation is complete 360, 370.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. In a press brake device having a punch mounted on a ram and a cooperating die for forming at least a first and a second flange on a workpiece and a primary safety device for protecting a pinch point between the punch and the die, a method for utilizing a secondary light curtain safety device for detecting intrusion into a crush zone during a process of forming the second flange on the workpiece, the crush zone being defined as an area between a leading edge of the first flange on the workpiece and the ram, wherein said method comprises the steps:

providing a secondary light curtain assembly including a light curtain emitting array and a light curtain detecting array, said secondary light curtain assembly being in operative communication with said ram;

selectively positioning said secondary light curtain assembly so as to emit a light curtain at a position in relation to a face of said ram, said position being selected in order to detect an intrusion by a foreign object into said crush zone disposed between the leading edge of the first flange on the workpiece and the face of the ram;

detecting an intrusion into said crush zone by said foreign object;

ceasing downward movement of said ram upon detection of said intrusion into said crush zone, wherein operation of the press brake is halted upon detection of said intrusion of said foreign object in said crush zone so as to prevent said foreign object from being crushed in said crush zone;

removing said foreign object from said crush zone; and restarting operation of said press brake so as to complete process of forming said subsequent flange on said workpiece.

2. The method of claim 1 wherein said step of selectively positioning said secondary light curtain assembly so as to emit said light curtain at said selected position in relation to said ram in order to detect said intrusion by a foreign object into a crush zone disposed between said primary flange on the workpiece and the ram further includes determining a stopping speed of said ram and position of said crush zone.

3. The method of claim 2 wherein wherein said foreign object has a thickness in a range of approximately 5-12 mm, wherein said secondary light curtain assembly is positioned so as to detect the presence of said foreign object in said crush zone, and further wherein said secondary light curtain assembly is positioned in so as to prevent said leading edge of said primary flange from intruding into said crush zone.

4. In a press brake device having a punch mounted on a ram and a cooperating die for forming at least a first and a second flange on a workpiece and a primary safety device for protecting a pinch point between the punch and the die, a method for utilizing a secondary light curtain safety device for detecting intrusion into a crush zone during a process of forming the second flange on the workpiece, the crush zone being defined as an area between a leading edge of the first flange on the workpiece and the ram, wherein said method comprises the steps:

providing a secondary light curtain assembly including a light curtain emitting array and a light curtain detecting array, said secondary light curtain assembly being in operative communication with said ram;

determining a selected position of a crush zone;

selectively positioning said secondary light curtain assembly so as to emit a light curtain at a position in relation to a face of said ram, said position being selected in order to detect an intrusion by a foreign object into said crush zone disposed between the leading edge of the first flange on the workpiece and the ram, wherein said secondary light curtain assembly is positioned so as to detect the presence of said foreign object in said crush zone, wherein said foreign object has a thickness in a range of approximately 5-12 mm, and further wherein said secondary light curtain assembly is positioned in so as to prevent said leading edge of said primary flange from intruding into said crush zone;

determining a stopping speed of said ram;

detecting an intrusion into said crush zone by said foreign object;

ceasing downward movement of said ram upon detection of said intrusion into said crush zone, wherein operation of the press brake is halted upon detection of said intrusion of said foreign object in said crush zone so as to prevent said foreign object from being crushed in said crush zone;

removing said foreign object from said crush zone; and restarting operation of said press brake so as to complete process of forming said subsequent flange on said workpiece.

5. The method of claim 4 wherein said foreign object is defined by at least a portion of an operator's body.

6. The method of claim 5 wherein said foreign object is defined by at least a portion of said operator's fingers.

* * * * *